INVENTOR
John L. Lay.
BY
ATTORNEYS

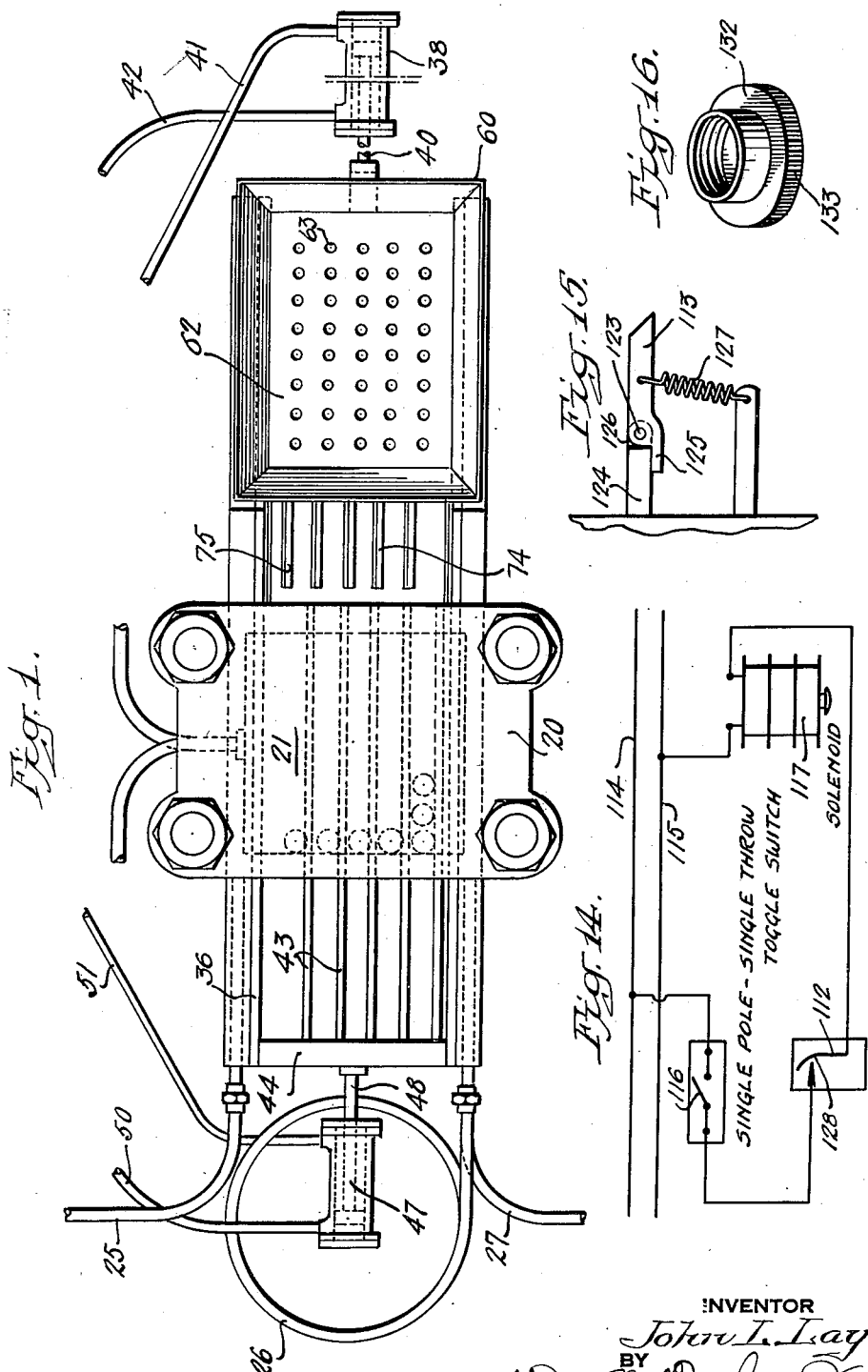

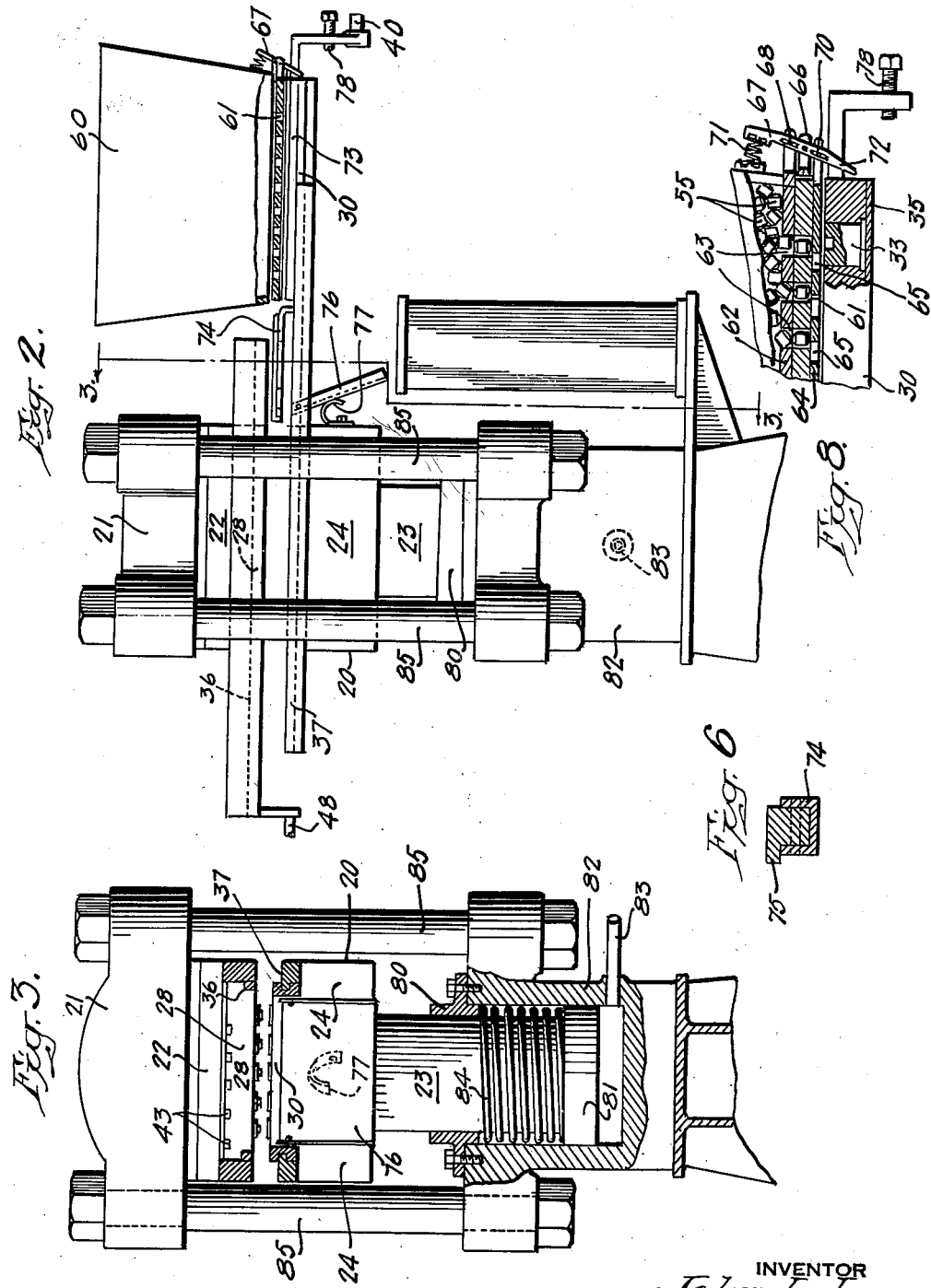

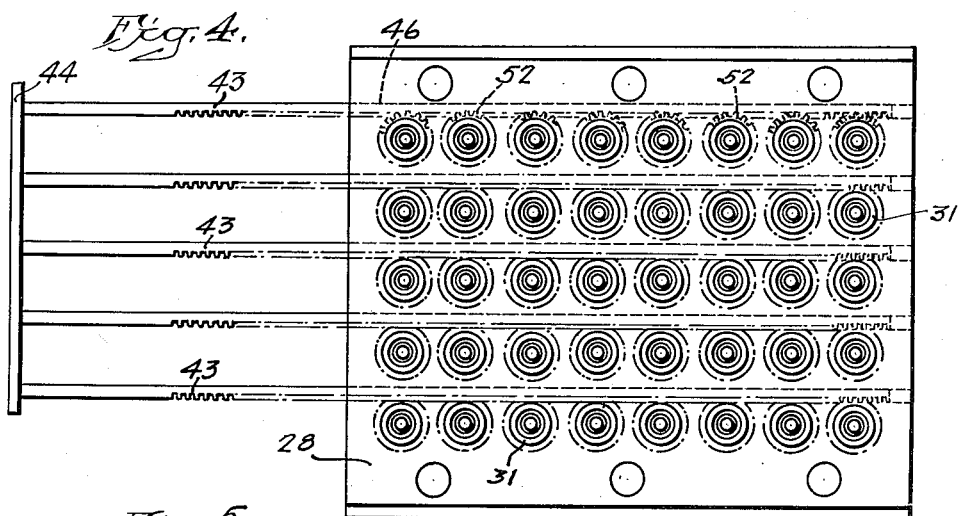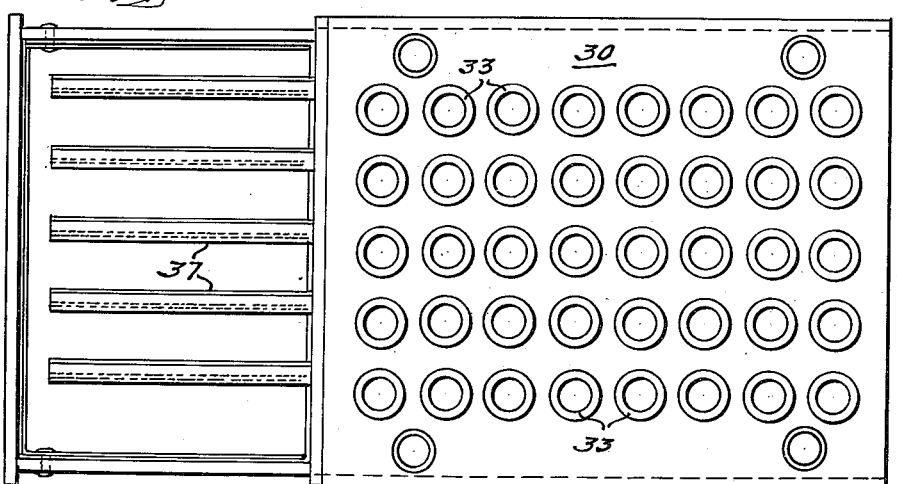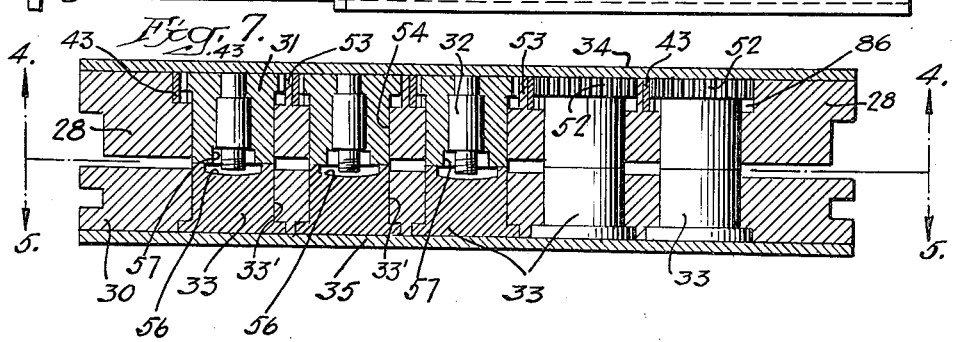

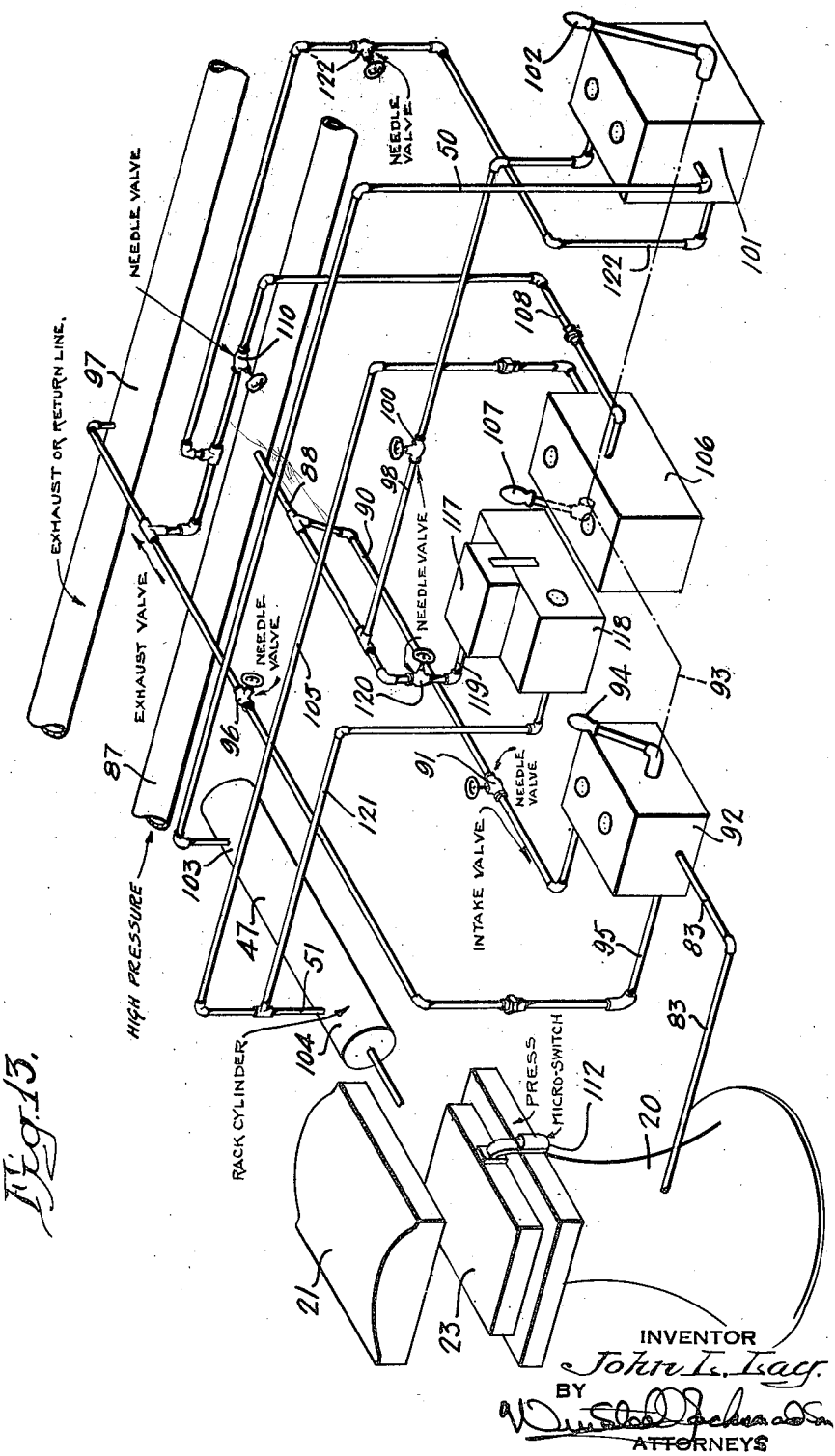

UNITED STATES PATENT OFFICE 2,587,337

MOLDING THREADED ARTICLES

John L. Lay, Ogden, Pa., assignor to A. H. Wirz, Inc., Chester, Pa., a corporation of Pennsylvania Application April 24, 1947, Serial No. 743,657

7 Claims. (Cl. 18—55)

My invention relates to the molding of threaded articles, especially from plastic, including both the mechanism and the methods involved.

A purpose of my invention is to avoid the danger of shearing off threads on plastic molded caps and the like during the separation of the dies or mold parts and the unscrewing of the force.

A further purpose is to permit the selection of relative mold part or die speeds with reference to the desired speed of closing of the mold without encountering difficulty due to stripping of the threads on molded articles during opening.

A further purpose is to render the relative rotation of the force and the molded article entirely independent of the speed of motion of the dies during separation.

A further purpose is to permit loosening and unscrewing of threaded articles from a force when the articles have extremely shallow seating in the female die, as for example in the case of mushroom caps.

A further purpose is to mount a force having threads in such a way that the force is firmly held when the die is closed, but has lost motion with respect to its support when the dies are opening, and preferably also to accomplish partial unthreading of the molded article from the force between the beginning and end of the lost motion.

A further purpose is to employ lost motion between the force and its support, and to rotate the force by mechanism put in operation by the travel of the ram.

Further purposes appear in the specification and in the claims.

In the drawings I have chosen to illustrate one only of the many embodiments in which my invention may appear, choosing the form shown from the standpoints of convenience in illustration, satisfactory operation and clear demonstration of the principles involved.

Figure 1 is a partially diagrammatic top plan view of a plastic molding press embodying my invention.

Figure 2 is a side elevation of the structure of Figure 1, partially broken away to show structure at the bottom of the hopper.

Figure 3 is a section of Figure 2 on some such line as 3—3 and with ram parts broken away to show the structure.

Figure 4 is a bottom plan view of the forces and force supports.

Figure 5 is a top plan view of the female dies.

Figure 6 is an enlarged sectional view of a disengaged finger.

Figure 7 is an enlarged cross section of the dies in operative relation.

Figure 8 is an enlarged sectional view of a portion of the loading mechanism.

Figure 9:
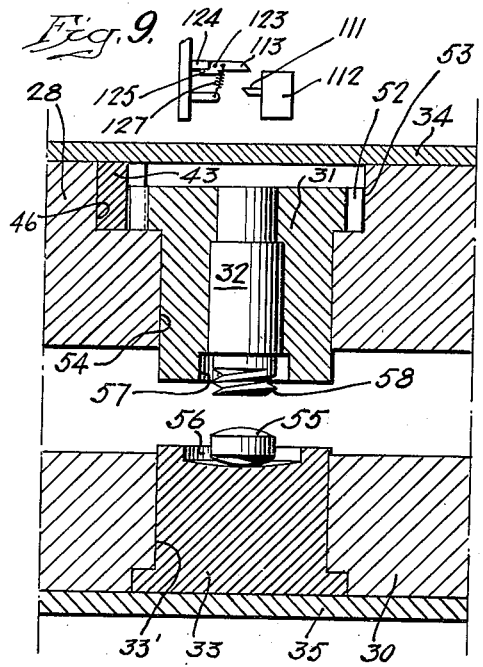

Figures 9 to 12 inclusive are fragmentary sectional position views enlarged with respect to Figure 7 and showing the dies closing and subsequently opening.

Figure 13 is a diagrammatic perspective showing the hydraulic system.

Figure 14 is an electrical circuit diagram.

Figure 15 is a fragmentary enlarged side elevation of the switch operator.

Figure 16 is a perspective of a mushroom cap.

In the drawings like numerals refer to like parts.

Describing in illustration but not in limitation and referring to the drawings:

In the prior art, when molding threaded articles of plastics or the like, such as caps for bottles, jars, collapsible tubes, and the like, a problem has been presented in unthreading threaded articles from the threaded portions of the mold. While the rule is not invariably adhered to, the threads are ordinarily carried by a male die or force, and this terminology is being used in agreement with the practice in the industry, notwithstanding that the male die or force commonly has cavity or female die surfaces, as for example in the common caps for bottles and collapsible tubes, and these cavity surfaces on the male die are sometimes threaded. Likewise following the industry, the mating die portion which is ordinarily mounted on the ram is designated herein as the female die although it may have male portions.

In the prior art it was originally the practice to remove threaded molded objects from the mold by hand, unthreading after the dies have separated. Automatic devices have also been developed which rotate the force by gearing after the dies separate, but while the molded object is held against rotation by the female die. (See Pfeilsticker U. S. Patent 2,394,260, granted February 5, 1946, for Method of and Machine for Molding.)

While such prior art automatic devices have represented a distinct advance over the manual method of removing the molded pieces from the threaded die, serious difficulties have developed. In the prior art it has been the practice to open the dies and operate the racks which rotate the forces simultaneously, the movable die being ordinarily carried by a ram which is closed by hydraulic pressure and opened by a spring when the hydraulic pressure is released, while the gearing rotating the force is ordinarily operated by a hydraulic cylinder which has been connected to the same hydraulic control valve. Under ideal conditions this may operate satisfactorily, but in many cases it has been found that the rotation of the gearing which turns the force is too rapid as compared with the rate of opening of the dies, so that while the caps or other molded objects are firmly seated in the female die, the force through its threaded relation with the molded object tends to push the molded object off the force and against the female die, stripping the threads on the molded object or marring or splitting it.

This problem is complicated by the fact that the hydraulic pressure heretofore employed for the ram has been that employed for the hydraulic mechanism operating the gearing which rotates the force, and the controlling factor in the selection of such pressure is the speed of closing of the ram which will adequately get rid of gas in the particular mold contour and with the particular plastic composition. The closing rate of the dies therefore has controlled the entire cycle, since it compresses the particular spring employed for opening, and it determines the pressure which has heretofore been used in rotating the forces. Every change of plastic or mold design therefore has necessitated some consideration of change of the closing speed of the ram, and where the closing speed has been changed this has frequently caused change of the speed of rotating the force at a different rate than the change of the speed of the ram.

Another variable factor which influences the speed of opening is the extent of adhesion by each die to the molded object, which controls the break-away pressure when the mold separates.

A further difficulty has developed in that in some cases the ram has moved away so quickly that the holding action of the female die against rotation of the molded object when the force turns has been lost before the molded object has been unthreaded, or unthreaded to the desired extent. This has been less serious in the case of bottle caps where a rather great axial extent of interlock is possible between the female die and the object molded, but it has been very serious in mushroom caps of the character employed on collapsible tubes, where there is only a narrow flange which can interlock between the female die and the article molded. In mushroom caps an error of as little as $\frac{1}{32}$ to $\frac{1}{16}$ of an inch in excessive withdrawal of the ram before the force has been properly rotated will prevent the mechanism from functioning and this is difficult to control when the parts are moving at substantial speeds.

In accordance with the present invention I provide lost motion between the force and the force support during opening of the dies, so that the force can move with the female die during the initial opening movement and can be rotated at some point along the range of the lost motion, with assurance that the molded object will be fully socketed in the female die to prevent rotation. The relative speeds of withdrawal of the female die and rotation of the force are thus independent of one another within wide limits, and the speed of die closing and hydraulic pressure used therefor can be varied widely without stripping the threads or marring the molded objects, and without unsocketing of molded objects from the female die before the force has been properly rotated.

In accordance with my invention, I desirably rotate the force automatically in response to the extent of withdrawal of the ram, but without reference to the speed of the ram.

I will first describe the conventional prior art heated platen press in which my invention will find its best application.

I illustrate a press 20 having a base 21, a head 22, and a ram 23 having vertical movement. The ram 23 is provided with a ram head 24 which cooperates with the head 22 and both the heads 22 and 24 are suitably heated as for example by steam introduced through a pipe 25, first to the head 22 and thence through an intermediate pipe 26 connecting the head 22 with the head 24, from which the steam discharges through a pipe 27. The pipes 26 and 27 are suitably flexible to permit the ram to move up and down.

On the under side of the stationary head 22 a gang molding die or force support 28 is applied. The die 28 carries primarily male parts and a lower gang molding die 30 carries primarily female die parts, which are raised and lowered by the ram. The cooperating dies 28 and 30 are aligned prior to closing by suitable pins, not shown, so that the forces 31 in the upper die or force support 28 provided with inserts 32 carrying the threads suitably cooperate with female die elements 33 in bores 33' in the female die 30. The forces 31 are suitably backed up by a backing plate 34 and the female die elements 33 are suitably backed up by a backing plate 35 so that the components of each die or mold part form a complete unit.

The upper die 28 is attached to the stationary head by guide bars 36, which permit it to be withdrawn to the side for replacement or inspection. The lower die 30 is attached to the ram head by guide bars 37, and moves vertically with the ram, while at the same time when the dies are open the lower die can be reciprocated to the side.

The lateral reciprocation of the lower die is controlled by a hydraulic cylinder 38 and piston and rod 40. The cylinder is supplied with hydraulic fluid through connections 41 and 42. The upper die 28 acts as a housing for a plurality of parallel racks 43, which are attached to a crosshead 44.

The racks extend in slots 46 of the upper die 28 and are guided thereby, while the crosshead 44 is guided by guide bars 36. The racks and crosshead are caused to reciprocate by a hydraulic cylinder 47 and a piston and piston rod 48. Suitable hydraulic connections are made to the cylinder at 50 and 51. Each of the racks meshes with a gear 52 on each force 31, the gear being suitably located in a counterbore 53 at the upper end of the bore 54 in the die 28 through which each force extends. Molding compound suitably in the form of a preformed pellet 55 is placed in each cavity 56 of the female die elements 33, to be formed by contact between the walls 57 of the force, the walls 58 suitably threaded to the force insert, and the female die.

The insertion of the molding compound such as phenolformaldehyde plastic is accomplished by sliding the mold to the side under the action of cylinder 38 and introducing the pellets through a feeding mechanism, comprising a hopper 60 having a series of openings 61 in its bottom, in alignment with the female die cavities 56. Located on top of the hopper bottom and adapted to slide thereon is a relatively thin plate 62 likewise carrying a series of openings 63 of similar size and spacing, capable in one position of registering with the openings 61. Immediately below the hopper bottom is another similar sliding plate 64 having cooperating openings 65. Mounted on the side of the hopper is a bearing 66 which pivots an arm 67 pivoted on the bearing near its center and slotted at its outer ends to receive pins 68 and 70 respectively located on extensions from the plates 62 and 64. A compression spring 71 normally holds the upper plate 62 with its opening 63 registering with the openings 61 of the hopper bottom and normally holds the plate 64 with its openings out of registry. The lower end of the arm 67 is extended at 72 to engage the lower die 30, reversing the relation of the plates 62 and 64. When the lower die 30 returns to its molding position in the press, the spring 71 reverses the plates 62 and 64, permitting pellets to refill the spaces 61 in the hopper bottom and holding the parts in this position until the lower die again returns to its position below the hopper.

Automatic mechanism is provided for discharging the finished product after it leaves the press. This mechanism comprises a frame 73 (Figure 2) mounted on the lower die, having a plurality of extension fingers 74, one for each row of mold cavities. The fingers are preferably of channel form as shown in Figure 6, and support contact strips 75 of some yieldable material such as rubber. One edge of each strip 75 is positioned to contact the outer face of each finished molded article, so that the strips 75 act as wiper bars for completing the unscrewing of the molded articles from the forces when the frame 73 is moved laterally with the lower die to bring the fingers into a position below the upper die. Pivoted within the frame 73 and carried thereby is a dump tray 76 which is held up parallel with the frame 73 by the top of the ram head 24 during the time that the lower die is in the molding position within the press but is lowered by gravity over a cam finger 77 as the lower die 30 withdraws laterally from the press. This tray is pivoted at one end within the frame 73 and the weight of its free end causes it to tilt and discharge its content. Upon the return stroke of the lower die 30, the tray is returned to its initial receiving position under the influence of the cam finger 77.

An adjustable stop 78 is provided on the lower die to register it as it moves into position below the upper die by abutting against the side face of head 24.

The ram 23 is suitably guided at 80 and carries a piston 81 in a main hydraulic cylinder 82 supplied with hydraulic fluid at 83. The ram is raised by hydraulic pressure and is retracted by spring 84. The press is provided with the usual tension columns 85 and is to be regarded as any conventional plastic molding or similar press.

The structure thus far described may be regarded as illustrating the background of the invention, and as one desirable embodiment in which the invention may be applied, but is not itself part of my invention.

The counterbore 53 in which the gears 52 are contained is according to my invention extended at 86 to provide a lost motion space, permitting the forces and force inserts to move with respect to the die 28, following the retraction motion of the female die 30 as the ram is lowered. The teeth on the racks 43 are made wide enough to extend to the bottom of the counterbore so that the forces can be rotated at any position along the lost motion space.

The distance of the lost motion will vary with the individual installation, but I find that in many instances a lost motion of ⅛ to ¼" is quite satisfactory.

In accordance with my invention I completely dissociate the operation of the rack from the operation of the main ram, providing a separate connection of the rack to the source of hydraulic fluid through a separate needle valve or other control, so that the speed of motion of the ram can be changed without affecting the speed of rotation of the forces.

In order to permit automatic operation of the racks during the lost motion, mechanism depending upon the position of the main ram is provided for operating the racks to rotate the forces.

As seen in Figure 13 and partially in Figures 9 to 12 inclusive, the high pressure fluid is obtained from a main high pressure hydraulic line 87 and passes through a distributing line 88 branching at 90 to a needle valve control 91, which regulates the high pressure fluid flow to the main ram and thence to an intake valve 92, which in open high pressure position connects the high pressure line 90 to the ram cylinder pipe 83. In the opposite position of the valve operating handle 94 (interconnected to the other manual valves by any suitable interconnection 93), the high pressure from the line 90 is cut off at the valve 92 and the ram cylinder connecting pipe 83 is connected to the exhaust line 95 through the needle valve 96 extending to the exhaust or return header 97.

At the time the ram is moving upward, and preferably by interconnection 93 of the valve levers, the retraction stroke of the racks is accomplished by connecting high pressure fluid from line 98 through control needle valve 100 to valve 101 operated by lever 102 connecting through the valve in this position by pipe 50 to the remote end 103 of rack cylinder 47. Exhaust from the opposite end 104 of the rack cylinder 47 is accomplished by pipe 51 and branch pipe 105 to valve 106 operated by lever 107 and connecting through the valve in this position by exhaust pipe 108 through needle valve 110 to the exhaust header 97.

After the press is closed, as it begins to open, the ram moves for a short distance away from the upper die and moves the forces downward with the upper die along the lost motion, until the operator 111 of microswitch 112 carried by the ram is contacted by operating projection 113 mounted on the frame of the press to close the microswitch as best seen in Figures 14 and 9 to 12 inclusive, connecting power leads 114 and 115 through switch 116 in closed position to solenoid 117, opening solenoid valve 118 to permit high pressure fluid through pipe 119, needle valve 120, and solenoid valve 118 to flow through pipe 121 connected to the adjacent end 104 of rack cylinder 47. At the same time by shifting lever 102 on valve 101, when lever 94 is shifted to permit spring 84 to retract the main ram, pipe 50 from the remote end 103 of the rack cylinder 47 is connected by pipe 122 and needle valve 122' to the exhaust header 97.

To permit the cam projection 113 to move past the switch plunger 111 during the up stroke of the ram, the projection 113 is pivoted at 123 on a stationary pivotal mounting 124 on the frame, the abutment 113 being provided with a stop 125 against downward movement but relieved at 126 to permit free swinging in the upward direction against the action of a tension spring 127 which is lighter than the spring of the contact 128 of the microswitch, so that no circuit is closed during the upward movement of the microswitch with the ram.

In operation the hopper 60 is filled with blanks 55, as well as the spaces in the bottom of the hopper. Assuming that the lower die is in its position just about to reach the outer end of its stroke away from the press, being moved by the piston and piston rod 40, in the cylinder 38, under any suitable control not shown, the die engages the end of the arm 67 and moves it against the action of the spring 71 causing the upper plate 62 to shift and close the tops of the openings in the bottom of the hopper and at the same time shift the plate 64 to permit pellets occupying openings in the bottom of the hopper to drop through opening 65 into the female elements of the lower die which are in registry beneath the opening 65. As soon as the mold cavities are filled, the piston and rod 40 again is reversed causing the lower die to begin traveling toward the press. This travel is continued until it is halted by the stops 78 contacting the side walls of the press.

The handle 94 of valve 92 is now thrown into the position to admit high pressure fluid to the ram, and concurrently the handle 102 of valve 101 is thrown to the position to admit high pressure fluid to the remote end 103 of the rack cylinder, and the handle 107 of valve 106 is thrown to the position to exhaust from the end 104 of rack cylinder 47. Thus the ram moves up, bringing the dies from the position of Figure 9, through that of Figure 10, when the force insert first contacts the plastic, to that of Figure 11 in which the plastic object, here a mushroom cap, is molded. The abutment 113 swings out of the way in Figure 10 to let the microswitch operator pass without closing the microswitch, since the spring of the microswitch contact is stronger than the spring 127 on the operator. As the ram reaches a position between Figures 9 and 10, it picks up the forces which, as shown in Figure 10, have been resting at the bottom of the lost motion space, and moves them up, until as shown in Figure 11, they rest firmly against the back plate 34, when they resist further rise, and begin to mold the plastic.

Figure 11:
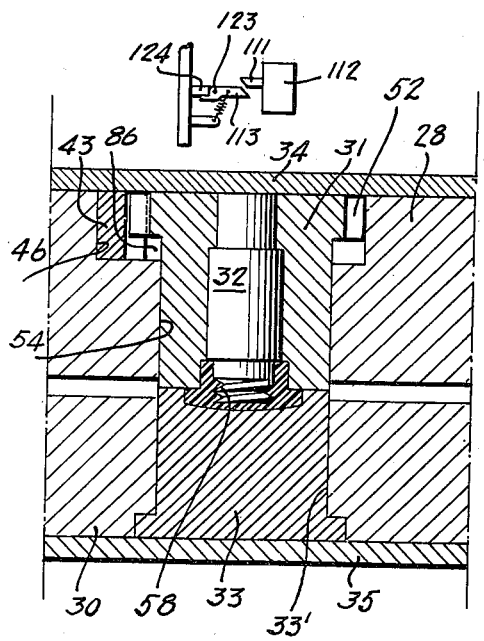

When the mold parts are in closed position as shown in Figure 11, sufficient heat is applied to set the plastic, where a thermosetting plastic is used.

Figure 12:
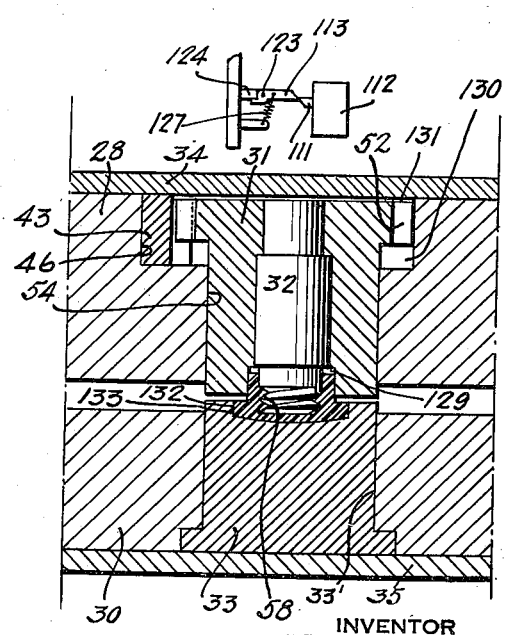

The valve handles 94, 102, and 107 are then reversed, cutting off high pressure fluid from the ram, connecting the ram to exhaust, permitting the ram spring to begin the return of the ram, and connecting the remote end of the rack cylinder to exhaust while cutting off the exhaust from the adjacent end of the rack cylinder. As the female dies 30 move down under the action of the ram, the adhesion to the molded object tends to hold the forces and the female die together, so that the forces initially begin downward motion along with the female die, travelling along the lost motion after the position as shown in Figure 12 for some short time interval. After the forces have begun their downward motion, the microswitch 112 on the ram contacts the operating projection 113 on the frame as shown in Figure 12, closing the microswitch and energizing the solenoid 117 to open the solenoid valve 118, admitting high pressure fluid into the nearer end 104 of the ram cylinder 47, thus starting the motion of the racks to turn the gears on the forces. Figure 12 illustrates this condition by showing the partial unscrewing of the cap at 129. In this figure it will be noted that there is a comparatively great lost motion space 130 below the forces, which is available in case the motion of the rack is so slow that the ram and female die moves down faster than the rotation of the forces unthreads the caps downwardly.

Thus it will be understood that the female die is free to move down more rapidly than the caps would be fed off the forces due to the rotation of the racks. At the same time it will be evident that as the racks operate, there is free space 131 above the forces so that if the racks tend to turn so rapidly that the forces would tend to move upward, in case the ram is not moving downward with comparatively great enough speed, the free space 131 of the lost motion can be used to permit upward movement of the forces without stripping the threads on the caps. At the same time it will be evident that if the ram tends to move downward more rapidly than would be desired, it does not have an opportunity to unseat the shallow shoulder 132 of the cap from the female die and therefore does not lose the interlock with the female die which would normally be obtained by the adhesion of the cap to the female die and any knurling or other interlock provided along the outer edges 133 of the female die.

Figure 10:
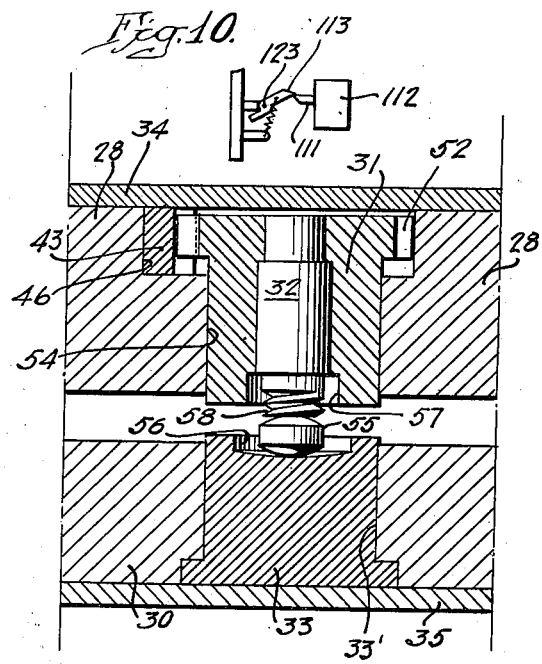

It will be understood that the relative lost motion distances 130 and 131 above and below the gears on the forces are a matter of choice and will vary at different stages of the cycle, since of course, when the mold is fully opened as shown in Figure 9, the lost motion will all be above the forces. Also these valves can be changed for different molding conditions.

It will be understood that the relative speed of the rack and the speed of the ram can be controlled by adjusting needle valves 120 and 91. The position at which the forces are rotated can be adjusted with respect to the lost motion by adjusting the relative positions of the microswitch and the microswitch operator.

In the preferred embodiment for average use it is considered best to rotate the forces when the forces have moved down about half of the lost motion space.

In view of my invention and disclosure variations and modifications to meet individual whim or particular need will doubtless become evident to others skilled in the art, to obtain all or part of the benefits of my invention without copying the process and structure shown, and I, therefore, claim all such insofar as they fall within the reasonable spirit and scope of my claims.

Having thus described my invention, what I claim as new and desire to secure by Letters Patent is:

1. The method of molding threaded articles, using cooperating mold parts, one of which has a thread and the other of which discharges the molded article solely by motion in the direction of relative movement of the mold parts, which comprises closing the mold parts and pressing molding material between them, moving a mold part opposite from the threaded mold part above referred to in a direction away from the molding position of the threaded mold part while concurrently moving the threaded mold part in the same direction as the motion of the opposite mold part solely under the force of adhesion of the molded product to the mold part opposite from the threaded mold part, and subsequently relatively twisting the threaded mold part and the molded article while the molded article is held by the opposite mold part.

2. The method of molding threaded articles using cooperating mold parts, one of which is threaded and another of which is unthreaded and permits withdrawal of the threaded article solely by motion in the direction of relative motion of the parts, which comprises forming material to be molded between the mold parts, moving the unthreaded mold part relatively away from the molding position of the threaded mold part while concurrently moving the threaded mold part in the same direction as the motion of the unthreaded mold part solely under the action of the adhesion between the unthreaded mold part and the molded object, and subsequently relatively twisting the threaded mold part and the molded object while maintaining the threaded mold part free to move over a substantial lost motion toward or away from the unthreaded mold part during the unthreading, depending upon the relative rate of unthreading as compared with the speed of motion of the unthreaded mold part.

3. The method of molding threaded articles, using cooperating threaded and unthreaded parts, the unthreaded mold parts discharging the molded article directly in the direction of relative motion, which comprises moving the mold parts into closed position and thereby forming an article to be molded, moving the unthreaded mold part away from the molding position of the threaded mold part while concurrently moving the threaded mold part in the same direction as the motion of the unthreaded mold part solely under the action of the adhesion between the unthreaded mold part and the molded article, and relatively untwisting the threaded mold part from the molded article while it is held by the unthreaded mold part and while the threaded mold part is free to move over a substantial lost motion toward or away from the unthreaded mold part during the unthreading.

4. The method of molding threaded articles, using a male die having a threaded part and a female die which is capable of discharging the article solely by motion in the direction of the relative motion of the dies, which comprises closing the dies and compressing molding material between them, moving the female die opposite from the direction of relative closing movement while concurrently moving the threaded part in the same direction as the motion of the female die solely under the force of adhesion of the molded product, and subsequently relatively twisting the threaded part and the molded article while the molded article is held by the female die.

5. The method of molding threaded articles, using a male die having a threaded part and a female die which discharges the molded article solely by motion in the direction of the relative movement of the parts, which comprises forming material to be molded between the dies by closing the dies, moving the female die opposite to the direction of relative closing movement while concurrently moving the threaded part in the same direction as the motion of the female die solely under the action of the adhesion between the female die and the molded object, and subsequently relatively twisting the threaded part and the molded object while maintaining the threaded part free to move over a substantial lost motion away from or toward the female die during the unthreading depending upon the relative rate of unthreading as compared with the aforesaid opposite motion of the female die.

6. The method of molding threaded articles, using a male die having a threaded part and a female die which discharges the molded article solely by motion in the direction of the relative movement of the parts, which comprises moving the female die into closed position upon the male die and thereby forming an article of material to be molded, moving the female die in the direction opposite to its closing movement while concurrently moving the threaded part in the same direction as the motion of the female die solely under the action of the adhesion between the female die and the molded article, and relatively untwisting the threaded part from the molded article while it is held by the female die and while the threaded part is free to move over a substantial lost motion toward or away from the female die during the unthreading.

7. The method of molding threaded articles, using a male die having a threaded part and a female die which discharges the molded article solely by motion in the direction of the relative movement of the parts, which comprises moving the female die into closed position upon the male die and thereby forming an article of material to be molded, moving the female die in the direction opposite to its closing movement and concurrently moving the threaded part in the same direction as the motion of the female die solely under the action of the adhesion between the female die and the molded article, relatively untwisting the threaded part from the molded article while it is held by the female die and while the threaded part is free to move over a substantial lost motion toward or away from the female die during the unthreading, and concurrently continuing the withdrawal motion of the female die while the untwisting between the threaded part and the molded object is being accomplished.

JOHN L. LAY.

REFERENCES CITED

The following references are of record in the file of this patent:

UNITED STATES PATENTS

| Number | Name | Date |
|---|---|---|
| 2,047,379 | Matson | July 14, 1936 |
| 2,222,732 | Winegar | Nov. 26, 1940 |
| 2,238,198 | Weber | Apr. 15, 1941 |
| 2,336,212 | Baron et al. | Dec. 7, 1943 |
| 2,363,808 | Sayre | Nov. 28, 1944 |
| 2,391,527 | Tracy | Dec. 25, 1945 |
| 2,394,260 | Pfeilsticker | Feb. 5, 1946 |
| 2,404,631 | Gronemeyer | July 23, 1946 |